(12) United States Patent
Black et al.

(10) Patent No.: US 9,022,584 B2
(45) Date of Patent: May 5, 2015

(54) PROTECTING AN OPTICAL SURFACE

(75) Inventors: Stephen H. Black, Buelton, CA (US);
Thomas A. Kocian, Dallas, TX (US);
Buu Q. Diep, Murphy, TX (US)

(73) Assignee: Raytheon Company, Waltham, MA (US)

( * ) Notice: Subject to any disclaimer, the term of this patent is extended or adjusted under 35 U.S.C. 154(b) by 835 days.

(21) Appl. No.: 13/300,947

(22) Filed: Nov. 21, 2011

(65) Prior Publication Data
US 2012/0127579 A1    May 24, 2012

Related U.S. Application Data

(60) Provisional application No. 61/416,885, filed on Nov. 24, 2010.

(51) Int. Cl.
*G02B 27/00* (2006.01)
*G02B 1/11* (2006.01)
*G02B 1/10* (2006.01)

(52) U.S. Cl.
CPC . *G02B 1/11* (2013.01); *G02B 1/105* (2013.01)

(58) Field of Classification Search
None
See application file for complete search history.

(56) References Cited

U.S. PATENT DOCUMENTS 8,582,207 B2 *  11/2013  Fukuda et al. ................. 359/580
8,814,369 B2 *   8/2014  Sakai et al. .................... 359/601

FOREIGN PATENT DOCUMENTS

JP         2002022904  A  *  1/2002

* cited by examiner

*Primary Examiner* — Arnel C Lavarias
(74) *Attorney, Agent, or Firm* — Lando & Anastasi, LLP

(57) ABSTRACT

According to one embodiment, a method includes receiving a light beam at an anti-reflective layer of optically transmissive material. The anti-reflective layer has an outer surface disposed within a recess of a protective layer of optically transmissive material, such that the outer surface is protected by the recess and the protective layer from being contacted. The outer surface is further disposed along an optical path of an optical device disposed inwardly from the outer surface. The anti-reflective layer has an average cross-sectional thickness that is less than an average cross-sectional thickness of the protective layer. The method further includes modulating the light beam using the anti-reflective layer.

20 Claims, 2 Drawing Sheets

PROTECTING AN OPTICAL SURFACE

RELATED APPLICATION

This application claims the benefit under 35 U.S.C. §119 (e) of U.S. Provisional Application Ser. No. 61/416,885 filed Nov. 24, 2010, entitled System and Method for Protecting an Optical Surface.

BACKGROUND

Optical coatings may be used by particular optical devices for a variety of reasons. Certain optical coatings include one or more layers of material formed on a surface, such as a lens or mirror, which may alter the way in which the surface reflects or transmits light. One type of optical coating is an antireflection coating, which may reduce certain reflections from surfaces of optical elements, such as spectacle and photographic lenses. Another type of optical coating is high-reflector coating, which can be used, for example, to produce mirrors. Particular optical coatings may exhibit high reflection over one range of wavelengths, and anti-reflection over another range of wavelengths.

SUMMARY

According to one embodiment, a method includes receiving a light beam at an anti-reflective layer of optically transmissive material. The anti-reflective layer has an outer surface disposed within a recess of a protective layer of optically transmissive material, such that the outer surface is protected by the recess and the protective layer from being contacted. The outer surface is further disposed along an optical path of an optical device disposed inwardly from the outer surface. The anti-reflective layer has an average cross-sectional thickness that is less than an average cross-sectional thickness of the protective layer. The method further includes modulating the light beam using the anti-reflective layer.

Particular embodiments of the present disclosure may provide one or more technical advantages. For example, a system for protecting an optical coating and a method of forming the same is provided. Certain embodiments may mitigate the risk of damaging an optical coating by disposing the coating within a recess. In addition, certain embodiments may protect optical coatings in a manner that focuses or otherwise steers light beams, which may enhance precision and simplify optics. Certain embodiments may provide all, some, or none of these advantages. Certain embodiments may provide one or more other advantages, one or more of which may be apparent to those skilled in the art from the figures, descriptions, and claims included herein.

BRIEF DESCRIPTION OF THE DRAWINGS

For a more complete understanding of the present invention and advantages thereof, reference is now made to the following description taken in conjunction with the accompanying drawings, in which.

DESCRIPTION OF EXAMPLE EMBODIMENTS

Various example embodiments disclosed herein are explained in the context of one or more light-transmissive layers formed on a surface of an optical device. Certain optical devices may be capable of interacting with light beams impinging thereon and/or generating light beams. Light-transmissive layers may be used by particular optical devices for a variety of reasons. For example, certain light-transmissive layers may be used to enclose optical devices within a protective cavity. In addition, certain light-transmissive layers may be configured to focus, filter, reflect, diffract, steer, and/or otherwise modulate light beams, which in certain instances may enhance precision and simplify optics for certain optical devices. Particular light-transmissive layers may be formed of thin material that may be damaged if contacted by equipment. Certain embodiments disclosed herein may mitigate the risk of damaging one or more light-transmissive layers by using certain materials for the light-transmissive layer(s) and/or by disposing the layer(s) a protective recess, as discussed further below. The present disclosure should in no way be limited to the example implementations, drawings, and techniques illustrated below. The drawings are not necessarily drawn to scale.

Example embodiments of the present disclosure are best understood by referring to FIGS. 1A-4 of the drawings, like numerals being used for like and corresponding parts of the various drawings.

Figure 1A:
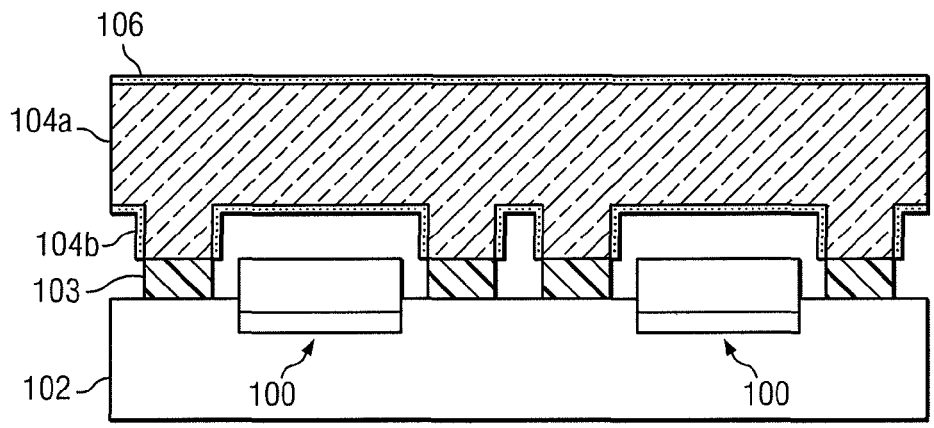
FIGS. 1A-1C illustrate cross-sections of a plurality of optical devices at various stages of formation according to an example embodiment.
Figure 1B:
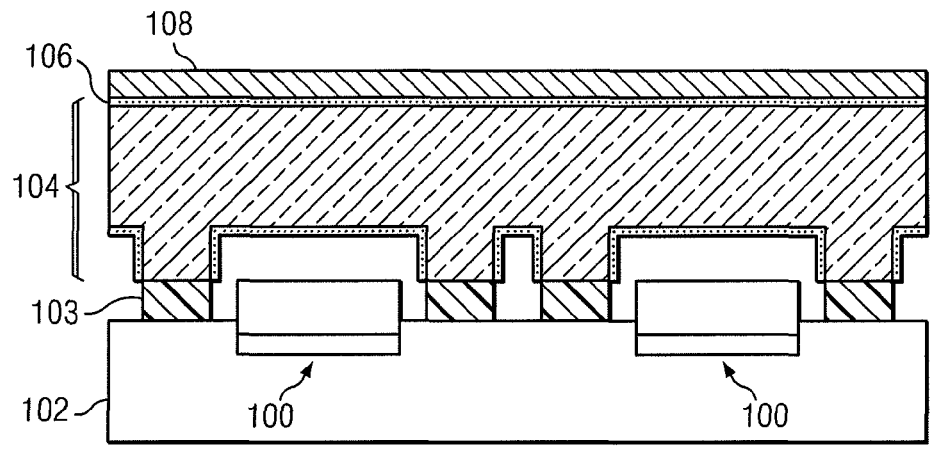
Figure 1C:
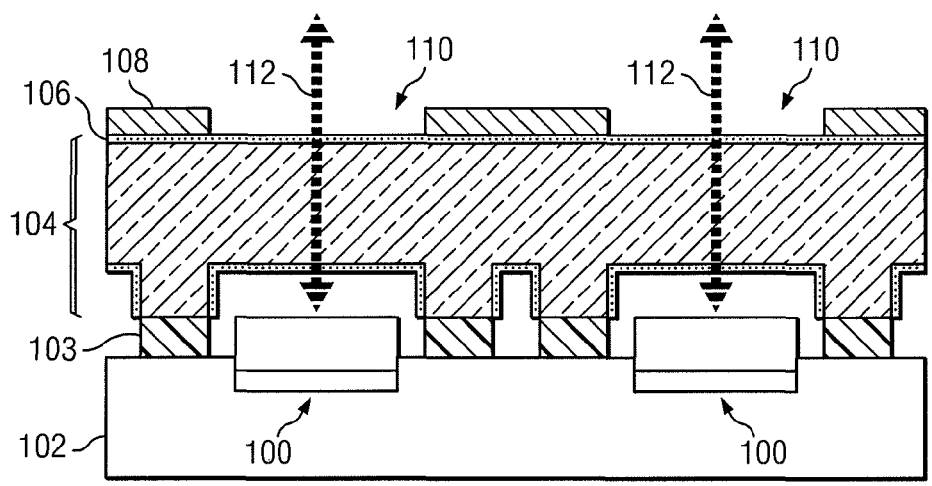

FIGS. 1A-1C illustrate cross-sections of a plurality of optical devices 100 at various stages of formation according to an example embodiment. As shown in FIG. 1A, each optical device 100 may be formed on a substrate 102. A first light-transmissive layer 104 may be formed outwardly from the optical devices 100. A second light-transmissive layer 106 may be formed outwardly from the first light-transmissive layer 104. In certain embodiments, first light-transmissive layer 104 and/or second light-transmissive layer 106 may be susceptible to being damaged if contacted (e.g., by automated wafer handling equipment). In particular applications, defects 25 microns wide or greater in either the first or second light-transmissive layers 104 and 106 may result in unacceptable optical artifacts that may reduce yield. In other applications, defects 5 microns wide or greater in either the first or second light-transmissive layers 104 and 106 may result in unacceptable optical artifacts that may reduce yield. Various embodiments may facilitate protecting light-transmissive layers 104 and/or 106 against unacceptable optical artifacts.

Optical devices 100 may be any electro-optical device capable of interacting with light beams impinging thereon and/or capable of generating light beams. As shown in FIG. 1C, for example, certain optical devices 100 may be capable of detecting and/or modulating light beams 112 propagating through light-transmissive layers 104 and/or 106 to optical devices 100. Additionally or alternatively, certain optical devices 100 may be capable of generating light beams 112 that originate at optical devices 100 and propagate away from optical devices 100 through light-transmissive layers 104 and/or 106. Certain ones of optical devices 100 may be an infrared detector capable of receiving light beams 112 and generating and/or responding to electrical signals. Certain other ones of optical devices 100 may be an infrared laser diode capable of generating infrared light beams 112. In particular embodiments, each optical device 100 is formed and packaged using wafer-level processing; however, any suitable processing may be used including, for example, processing that includes the formation and/or packaging of devices 100 at a die level.

Substrate 102 may include one or more layers of silicon (Si), germanium (Ge), cadmium telluride (CdTe), cadmium zinc telluride (CdZnTe), gallium arsenide (GaAs), and/or any other suitable material or combination of materials upon which optical devices 100 and/or light-transmissive layers 104 and/or 106 may be formed. In certain embodiments, substrate 102 may be optically transmissive to certain light beams 112. In alternative embodiments, substrate 102 may be optically opaque to certain light beams 112. In a particular embodiment, substrate 102 is a wafer used to form multiple arrays of optical devices 100 that may be singulated from each other during processing.

First light-transmissive layer 104 may include any layer or combination of layers capable of receiving light beams 112 impinging thereon and transmitting at least a portion of those light beams 112 toward and/or away from optical devices 100. As shown in FIGS. 1A-1C, for example, light-transmissive layer 104 may include a stack of two or more layers 104a and 104b that may have substantially different thicknesses with respect to each other. In certain embodiments, layer 104b may have anti-reflective properties. First light-transmissive layer 104 may at least partially define a cavity enclosing all or a portion of one or more respective optical devices 100.

In certain embodiments, first light-transmissive layer 104 may include or form a portion of a substrate that is bonded to substrate 102, such that optical devices 100 are disposed between two substrates. For example, first light-transmissive layer 104 may be a wafer comprised of silicon (Si), germanium (Ge), and/or any other suitable material capable of transmitting light beams 112.

One or more spacer layers 103 may provide a superstructure upon which first light-transmissive layer 104 and/or second light-transmissive layer 106 may be formed or mounted. As shown by way of example in FIG. 1A-1C, spacer layers 103 may be disposed between, and longitudinally outward from, optical devices 100. Spacer layers 103 may be configured to be optically transmissive and/or optically opaque to certain light beams 112. If a portion of spacer layers 103 is disposed within the path of light beams 112, for example, that portion may be optically transmissive to certain light beams 112, thereby allowing the transmission of light beams 112 through spacer layers 103 to and/or from optical devices 100. As another example, portions of spacer layers 103 that are outside the path of light beams 112 may be either optically transmissive or optically opaque to light beams 112. In certain embodiments, spacer layer 103 may be a solder seal.

Second light-transmissive layer 106 may include any layer or combination of layers configured to focus, filter, reflect, diffract, steer, and/or otherwise modulate light beams impinging thereon. For example, second light-transmissive layer 106 may selectively pass light beams 112 in the infrared spectrum while filtering out other wavelengths of light; however, any suitable selectively light filtration may be used. In particular embodiments, second light-transmissive layer 106 includes an anti-reflective coating. In various embodiments, second light-transmissive layer 106 may have an average cross-sectional thickness that is less than an average cross-sectional thickness of first light-transmissive layer 104. For example, second light-transmissive layer 106 may have an average cross-sectional thickness that is less than 10% of the average cross-sectional thickness of the first light-transmissive layer 104.

Various embodiments may mitigate the risk of damaging second light-transmissive layer 106 by hardening an exposed surface of light-transmissive layer. For example, an outer surface of light-transmissive layer 106 may be hardened by the application of a diamond-like coating. Additionally or alternatively, the risk of damaging second light-transmissive layer 106 may be mitigated by providing a plurality of recesses 110 and disposing second light-transmissive layer 106 at least partially within those recesses 110, as explained further below.

FIG. 1B illustrates a cross-section of the optical devices 100 of FIG. 1A after the formation of a protective sacrificial layer 108 outwardly from second light-transmissive layer 106. In this example, protective sacrificial layer 108 is formed from photoresist or polyamide; however, any suitable material may be used.

As shown in FIG. 1C, portions of protective sacrificial layer 108 may be selectively removed to form recesses 110 outwardly from each of the electro-optical devices. The selective removal of protective sacrificial layer 108 may be effected, for example, using conventional pattern and etching techniques. In certain instances, the selective removal of protective sacrificial layer 108 may be followed by a strip process to more fully remove the protective sacrificial layer 108 and/or other residue that might otherwise remain within the light paths that will be used by electro-optical devices 100. Portions of second light-transmissive layer 106, including those portions within the light paths of light beams 112, may be disposed within recesses 110. By disposing portions second light-transmissive layer 106 within recesses 110, the risk of damaging second light-transmissive layer 106 during subsequent processing, handling, storage, and/or operation may be mitigated.

Figure 2:
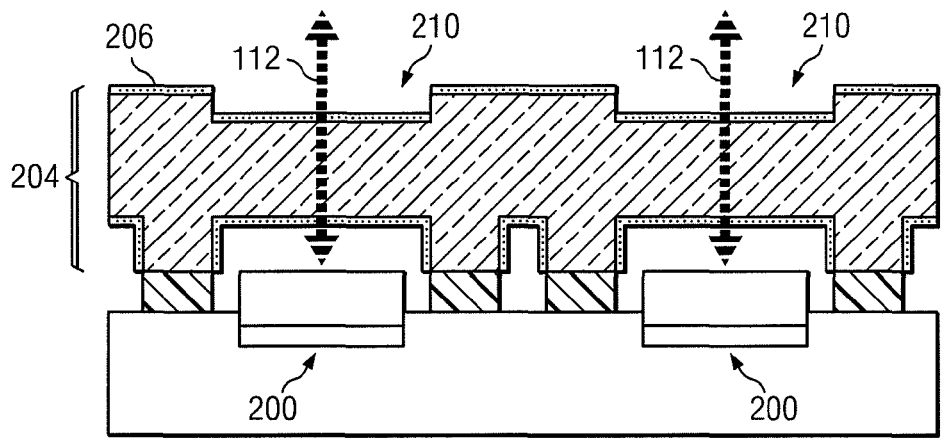
FIG. 2 illustrates a cross-section of optical devices after the formation of substantially planar recesses according to an alternative embodiment.

FIG. 2 illustrates a cross-section of optical devices 200 after the formation of substantially planar recesses 210 within first light-transmissive layer 204, and after the formation of a second light-transmissive layer 206 outwardly from first light-transmissive layer 204, including within recesses 210, according to an alternative embodiment. Optical devices 200, first light-transmissive layer 204, and second light-transmissive layer 206, may have certain structure and functionality substantially similar to that of optical devices 100, first light-transmissive layer 104, and second light-transmissive layer 106, respectively, of FIGS. 1A-1C. Recesses 210 may be formed, for example, by selectively removing portions of first light-transmissive layer 204 using conventional pattern and etching techniques; however, any suitable processing may be used. Recesses 210 are disposed outwardly from optical devices 200 within the light paths 112 that will be used by optical devices 200.

The portions of second light-transmissive layer 206 included within light paths 112 may be at least partially protected by recesses 210, thereby mitigating the risk of damaging those portions of second optically transmissible layer 206. Selectively removing portions of first light-transmissive layer 204, as opposed to an organic sacrificial layer, may further improve yield by minimizing or eliminating exposure to organics during subsequent processing, handling, storage, and/or operation.

Figure 3:
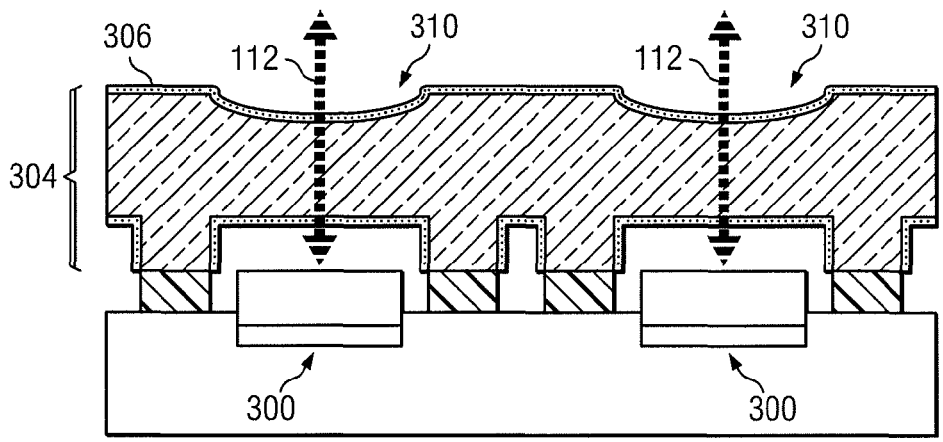
FIG. 3 illustrates a cross-section of optical devices after the formation of substantially non-planar recesses according to an alternative embodiment.

FIG. 3 illustrates a cross-section of optical devices 300 after the formation of substantially non-planar recesses 310 within first light-transmissive layer 304, and after the formation of a second light-transmissive layer 306 outwardly from first light-transmissive layer 304, including within non-planar recesses 310, according to an alternative embodiment. Optical devices 300, first light-transmissive layer 304, and second light-transmissive layer 306, may have certain structure and functionality substantially similar to that of optical devices 100, first light-transmissive layer 104, and second light-transmissive layer 106, respectively, of FIGS. 1A-1C. In certain embodiments, non-planar recesses 310 may include concave Fresnel surfaces. In alternative embodiments, non-planar recesses 310 may comprise convex Fresnel surfaces. Recesses 310 may be formed, for example, by selectively removing portions of first light-transmissive layer 304 using a powered pattern and etch technique; however, any suitable processing may be used. Recesses 310 are disposed outwardly from optical devices 300 within the light paths that will be used by optical devices 300.

The portions of second light-transmissive layer 306 included within light paths 112 may be at least partially protected by recesses 310, thereby mitigating the risk of damaging those portions of second optically transmissible layer 306. Selectively removing portions of first light-transmissive layer 304, as opposed to an organic sacrificial layer, may further improve yield by minimizing or eliminating exposure to organics during subsequent processing, handling, storage, and/or operation. In addition, the non-planar surfaces of recesses 310 may be used to shape second sacrificial layer 306 in a manner that focuses or otherwise steers light beams, which may enhance precision and simplify optics.

Figure 4:
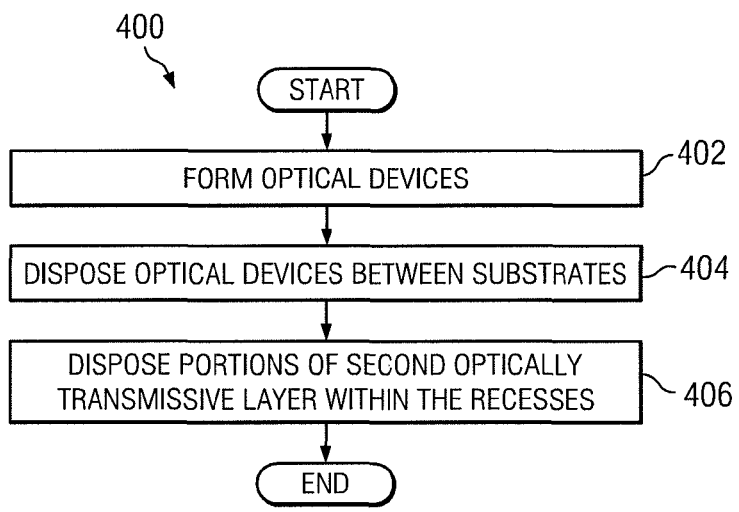
FIG. 4 is a flow chart illustrating a method for protecting a light-transmissive layer according to one embodiment.

FIG. 4 is a flow chart 400 illustrating a method for protecting one or more light-transmissive layers according to one embodiment. In this example, the method is explained in the context of light-transmissive layers 104 and 106 of FIGS. 1A-1C; however, any suitable light-transmissive layers may be used including, for example, the alternative embodiments shown in FIGS. 2 and 3.

At step 402, a plurality of optical devices 100 are formed on or coupled to a substrate 102. At step 404, a first light-transmissive layer 104 is formed on or coupled to substrate 102, such that the optical devices 100 are disposed between the substrate and the first light-transmissive layer. For example, first light-transmissive layer 104 may include or form a portion of a second substrate coupled to the substrate 102 used to form optical devices 100, such that optical devices 100 are disposed between two substrates (e.g., between two semiconductor wafers). As another example, first light-transmissive layer 104 may be formed outwardly from substrate 102 using semiconductor processing techniques.

At step 406, a second light-transmissive layer 106 is formed outwardly from or coupled to the first light-transmissive layer 104. In particular embodiments, the second light-transmissive layer 106 may include one or more layers of material collectively configured to focus, filter, reflect, diffract, steer, and/or otherwise modulate light beams impinging thereon, which in certain instances may enhance precision and simplify optics for certain optical devices. In addition, or alternatively, the second light-transmissive layer 106 may include one or more antireflective layers. At least portions of the second light-transmissive layer 106 may be disposed within a plurality of recesses 110. In certain embodiments, at least portions of each recess 110 may be disposed outwardly from a respective one of the optical devices 110. In particular embodiments, the recesses 110 may be formed in a protective sacrificial layer 108 disposed outwardly from the first and second light-transmissive layers 104 and 106, as discussed previously by way of example with reference to FIG. 1C. In alternative embodiments, the recesses may be formed by selectively removing portions of the first light-transmissive layer 204 and/or 304, as discussed previously by way of example with references to FIGS. 2 and 3.

The plurality of optical devices 100 and the first and/or second light-transmissive layers 104 and 106 may be configured such that light beams 112 may pass through the first and/or second light-transmissive layers 104 and 106 to and/or from the plurality of optical devices 100. For example, second light-transmissive layer 106 may selectively pass light beams 112 in the infrared spectrum that are then transmitted through the first light-transmissive layer 104 to optical devices 100. As another example, light beams 112 originating at and/or reflected by optical devices 100 may be transmitted through first and/or second light-transmissive layers 104 and 106 in a direction away from optical devices 100. In various embodiments, second light-transmissive layer 106, 206, or 306, may have an average cross-sectional thickness that is less than an average cross-sectional thickness of its respective first light-transmissive layer 104, 204, or 304, respectively. For example, second light-transmissive layer 106 may have an average cross-sectional thickness that is less than 10% of the average cross-sectional thickness of the first light-transmissive layer 104.

In certain instances, steps 402, 404, and/or 406 may be used to at least partially form packages around the optical devices 100. Each package may be defined at least in part by a stack of layers that include substrate 102 and first light-transmissive layer 104. In certain instances, one or more packaged optical devices 100 may be singulated from other ones of the optical devices by dividing the stack into discrete pieces.

Certain embodiments disclosed herein may mitigate the risk of damaging one or more light-transmissive layers by disposing the layer(s) a protective recess of one or more protective layers, which may facilitate protecting the light-transmissive layer(s) against unacceptable optical artifacts. In addition, or alternatively, certain embodiments may mitigate the risk of damaging one or more light-transmissive layers by using certain materials for the light-transmissive layer(s). The light-transmissive layers and/or its underlying layers may be configured to facilitate modulating light using the light-transmissive layers, which in certain instances may enhance precision and simplify optics for certain optical devices.

Although an example method is described, the steps may be accomplished in any appropriate order. For example, if light-transmissive layers 104 and 106 are formed on a substrate different from substrate 102, light-transmissive layer 106 may be formed outwardly from or coupled to light-transmissive layer 104 before light-transmissive layer 104 is coupled to substrate 102. The present invention contemplates using methods with additional steps, fewer steps, or different steps, so long as the methods remain appropriate for protecting an optical surface.

Although the present disclosure has been described above in connection with several embodiments, a myriad of changes, substitutions, variations, alterations, transformations, and modifications may be suggested to one skilled in the art, and it is intended that the present invention encompass such changes, substitutions, variations, alterations, transformations, and modifications as falling within the spirit and scope of the appended claims.

What is claimed is:
1. An apparatus comprising:
   a plurality of optical devices coupled to a substrate;
   a protective layer having a plurality of recesses disposed therein, each recess disposed outwardly from a respective one of the plurality of optical devices coupled to the substrate and within an optical path of the respective one of the plurality of optical devices coupled to the substrate; and
   an anti-reflective layer disposed within each of the plurality of recesses of the protective layer, the anti-reflective layer configured to receive a light beam impinging thereon, minimize reflection of the light beam, modify a characteristic of the received light beam, and transmit a modified light beam.

2. The apparatus of claim 1, wherein the anti-reflective layer is configured to modify the characteristic of the received light beam by filtering a range of wavelengths of the received light beam.

3. The apparatus of claim 1, wherein the anti-reflective layer is configured to modify the characteristic of the received light beam by focusing the received light beam.

4. The apparatus of claim 1, wherein the anti-reflective layer is configured to modify the characteristic of the received light beam by redirecting the received light beam.

5. The apparatus of claim 1, wherein the anti-reflective layer has an average cross-sectional thickness that is less than an average cross-sectional thickness of the protective layer.

6. The apparatus of claim 1, wherein the protective layer is disposed outwardly from the anti-reflective layer.

7. The apparatus of claim 1, wherein the anti-reflective layer is disposed outwardly from the protective layer.

8. The apparatus of claim 1, wherein the anti-reflective layer comprises an outer surface that is substantially planar.

9. The apparatus of claim 1, wherein the anti-reflective layer comprises an outer surface that is substantially convex.

10. The apparatus of claim 1, wherein the anti-reflective layer comprises an outer surface that is substantially concave.

11. A method comprising:
disposing respective portions of an anti-reflective layer of optically transmissive material within each of a plurality of recesses in a protective layer of optically transmissive material, the anti-reflective layer having an average cross-sectional thickness that is less than an average cross-sectional thickness of the protective layer, the anti-reflective layer configured to minimize reflections of light beams from an outer surface of the anti-reflective layer, the protective layer configured to protect the respective portions of the anti-reflective layer from being contacted; and
forming an optical assembly such that each of the plurality of recesses is disposed outwardly from a respective one of a plurality of optical devices.

12. The method of claim 11, further comprising defining the plurality of recesses in the protective layer by selectively removing portions of the protective layer.

13. The method of claim 11, wherein disposing respective portions of the anti-reflective layer within each of a plurality of recesses in the protective layer comprises forming the anti-reflective layer outwardly from the protective layer.

14. The method of claim 11, wherein disposing respective portions of the protective layer within each of a plurality of recesses in the anti-reflective layer comprises forming the protective layer outwardly from the anti-reflective layer.

15. The method of claim 11, wherein the respective portions of the anti-reflective layer each comprises a non-planar outer surface.

16. The method of claim 11, wherein forming the optical assembly comprises bonding first and second substrates to each other, the first substrate comprising the plurality of optical devices, the second substrate comprising the anti-reflective layer and the protective layer.

17. A method comprising:
receiving a light beam at an anti-reflective layer of optically transmissive material, the anti-reflective layer having an outer surface disposed within a recess of a protective layer of optically transmissive material, such that the outer surface is protected by the recess and the protective layer from being contacted, the outer surface being further disposed along an optical path of an optical device disposed inwardly from the outer surface, the anti-reflective layer having an average cross-sectional thickness that is less than an average cross-sectional thickness of the protective layer; and
modulating the light beam using the anti-reflective layer.

18. The method of claim 17, wherein modulating the light beam using the anti-reflective layer comprises providing the optical device a filtered light beam by filtering a range of wavelengths of the received light beam using the anti-reflective layer.

19. The method of claim 17, wherein modulating the light beam using the anti-reflective layer comprises providing the optical device a focused light beam by focusing the received light beam using the anti-reflective layer.

20. The method of claim 17, wherein the anti-reflective layer is configured to minimize reflection of the light beam in a direction away from the optical device.

* * * * *